United States Patent Office 3,840,673
Patented Oct. 8, 1974

3,840,673
ALPHA AMYLASE IS INCORPORATED INTO A BUTTER USED TO PREPARE POTATO SNACKS
Cornelis Kortschot, Willowdale, Ontario, Canada, and Peter F. Adams, Eastwood, Australia, assignors to Corporate Foods Limited, Toronto, Ontario, Canada
No Drawing. Filed Feb. 19, 1971, Ser. No. 117,065
Claims priority, application Canada, Mar. 10, 1970, 77,009
Int. Cl. A23b 7/02
U.S. Cl. 426—48                                              2 Claims

ABSTRACT OF THE DISCLOSURE

Alpha-Amylase is incorporated into a batter of potato solids from which a snack food is produced. The alpha amylase partially hydrolyizes the starch molecules of said potato solids thereby increasing the solids content and reducing the viscosity of said batter. Said potato snack produced has a lower oil content than normal.

FIELD OF THE INVENTION

This invention relates to a new process for the manufacture of snacks foods such as potato chips with a reduced caloric content. The food products so produced are crisp and ready to eat and can be manufactured from a wide range of raw materials.

BACKGROUND OF THE INVENTION

In our copending United States patent application Ser. No. 2,407 entitled "Textured Food Products," of filing date Jan. 12, 1970, now U.S. Pat. No. 3,698,914, we have described a process for the production of crisp snacks. In the process described in our earlier application, potato flour and other starch additives are formed into a batter, cast into a film, dried and cooked.

The present invention is also concerned with the production of crisp snack foods. In particular, it is concerned with the production of crisp snack foods having a lower oil content than normal.

For economic reasons it is advantageous to use commercially available potato solids and a suitable low cost material is sold as "potato flour." Potato flour is prepared by drum drying of a pre-cooked mashed potato on a drum dryer and it can be assumed that virtually all the starches in the potato are fully gelatinized either during the cooking or drying steps. When this flour is dehydrated in a process to make potato snacks, a high viscosity develops almost immediately. This high viscosity limits the solids content in the dough or batter and results in increased drying time. In the process of our co-pending United States patent application Ser. No. 2,407, where we wish to produce a batter with enough fluidity to allow aeration and casting, the high viscosity of the hydrated potato flour is especially troublesome.

Potato chips usually contain about 40% oil and 60% potato solids. The caloric content of potato chips is about 600 cal/100 grams. Because of the high caloric content there has been a considerable amount of interest in a chip with a reduced caloric content. If a potato chip is fabricated from dry ingredients it becomes possible to replace some of the nutritional ingredients with non-nutritive ingredients such as edible cellulose or to replace starch with proteins by using for instance soy flour or soy isolates. The oil content that accounts for the major part of the caloric content of a potato chip must also be reduced.

With unmodified potato flour to which was added 33⅓% rice flour it was found that the practical limit of the solids content was around 23%. A higher solids content would produce a viscosity that is not suitable for aeration and casting. Drying of the cast film is carried out on a steel belt to a moisture content of about 30%. To produce one pound of the film containing 30% moisture it is necessary to remove 2.04 lb. of water during the drying step. By increasing the solids content of the batter to 35% it is only necessary to evaporate 1.00 lb. of water to produce one pound of film with 30% moisture remaining. Drying requirements have been reduced by 50%.

A further advantage of an increased solids content is the fact that it is possible to reduce the casting thickness while retaining the same amount of solids per square inch. Thus it was found that whereas the batter with 23% solids should be cast at a thickness of 60 mils to produce a chip with acceptable thickness and strength it is possible to reduce the casting thickness to around 40 mils when batter of 35% solids is used. Since drying rates relates to the square of the thickness, the reduction in thickness from 60 to 40 mils would theoretically produce an increase in drying rate of 125%.

It is clear from these calculations that an increase in solids content would reduce drying time very substantially and reduce processing costs by a factor of three or four.

DESCRIPTION OF THE PRIOR ART

Various processes in which enzymatic action has been used to modify starch-containing products, such as potato products, are known. Hence, Hilton in U.S. Pat. No. 3,109,739 discloses a process in which enzymatic oxidation is used for reducing the amount of reducing sugars in a mixture containing finely divided potato solids and liquid. Similarly, Singer in U.S. Pat. No. 2,175,486 uses diastase enzymes to modify starch compositions to dextrins, and Wachman et al. in U.S. Pat. No. 1,916,872 discloses a process for the dextrinising of starch using a mineral acid and diastase enzymes. Bode in U.S. Pat. No. 3,249,512 uses enzymes to convert starch to dextrose.

However, none of these inventors have solved the viscosity problem that exists when using a suspension containing a high concentration of potato solids in the manner adopted according to the present invention.

SUMMARY OF THE INVENTION

Expressed in simple terms, the present invention relates to a method that allows an increase in the solids content of a batter produced from potato flour by reducing the viscosity of the resulting suspension.

According to the present invention we have found that we can reduce the viscosity of a potato-water mixture by reacting the potato starches with an α-amylase enzyme for a short time. It is believed that this is accomplished by the α-amylase enzyme hydrolyzing at least part of the starch molecules. Using this process, we have found that it is possible to reduce the viscosity so that a fluid batter can be produced containing as much as 40% solids comprising approximately 30% potato flour and 10% rice flour. The resulting product does not have any unpleasant flavour and possesses a good potato flavor after cooking, e.g. by frying. The enzymatic reaction produces a material which has good film-forming properties and improved drying rates. This improvement in properties probably results from the formation of dextrins from the starch by the action of the enzyme.

Several times we have mentioned that the reaction time of the enzyme on the suspension of potato solids is "short." This is indeed a key feature of the invention because it was found that if the reaction is allowed to proceed too far, a completely unpalatable product results. The off-flavour that can be described as chalky and astringent does not exhibit itself in the batter but becomes very unpleasant in the finished dry snack. We have not explained this flavour development but the fact that it develops in the finished product rather than the batter would suggest that the compounds responsible must be dehydrated in order to give this taste sensation.

We have found that there is more than one procedure that can produce a product that is free from off-flavour. The concentration of the enzymes, the rate of the reaction as controlled by temperature and the total reaction time must be balanced in such a way that the reaction is terminated as soon as possible after the desired reduction in viscosity is obtained. With a relatively high concentration of enzymes the reaction time is very short, when the concentration is reduced to 0.025% based on the concentration of solids, the reaction can be allowed to proceed as long as ten minutes.

After the enzyme has been allowed to react with the batter formed from the potato flour and water mixture, it can be deactivated quite simply by the action of heat. It was found that the resulting product could be cast on a flat surface and form a strong film that can be stripped from the drying surface with ease. The resulting film exhibits a structure with a uniform continuous surface, and due to the presence of this continuous uniform surface, the product had a reduced absorption of oil during the subsequent frying by immersion in hot oil or shortening. The unexpected result was a potato chip that contained less than 20% oil.

DESCRIPTION OF THE PREFERRED EMBODIMENTS

Hence, according to the present invention we provide a process for preparing a product suitable for cooking to produce a crisp snack food which comprises the steps of:

(a) mixing a food-stuff containing potato solids with an α-amylase enzyme to form a premix,
(b) dispersing this premix in water at a temperature at which the enzyme has good activity.
(c) heating the mixture until the enzyme is deactivated.
(d) shaping the resulting mixture to the described thickness, and
(e) drying the shaped mixture to a moisture content so the dried shaped mixture will produce a golden colour when cooked.

The product of the foregoing process when cooked rapidly by immersion in hot oil or shortening or by baking or toasting results in a chip with an oil content that is reduced by at least 50%.

According to a preferred feature of the present invention, step (c) of the process described above is followed by an aeration step. The objective of this step is to create a number of very small air bubbles in the mixture. Although this aeration is not essential and a chip with good eating qualities can be made without its use, we have found that aeration improves drying rates and by means of this step it is possible to more accurately control the tenderness of the chip. Aeration alters the fragility of the product by creating thinner layers of solids in the product.

In other processes ued to make snack products similar to potato chips, where a dough containing potato solids is rolled, sliced or extruded it cannot be expected that a continuous surface film is formed as is the case in the process of the present invention. In our process where a mixture with a batter consistency is cast onto a flat surface and dried, a continuous surface film is formed. We believe that the treatment with an α-amylase enzyme results in the formation of dextrin and this improves the ability of the material to form these surface films.

According to previously described processes in the art some manipulation of the oil content of fabricated chips is possible by adjusting the moisture content before frying and adjusting the frying conditions. The process of the present invention produces chips with an oil content that is reduced by at least 50% as has been indicated above. The reduced oil content is accompanied by a lower viscosity which is probably caused by increased porosity in the interior of the chip which in part is increased due to penetration of the oil or shortening used in the cooking step. When the oil or density of the product or process is compared with regular chips we find that there is a reduction of at least 20%.

When the reduction in oil, the reduction in density and the addition of some non-nutritive additive is combined in our process, we have a suitable method by which to produce a chip with a 50% reduction in calories per serving if the serving is measured by volume rather than weight.

The present invention is further illustrated by the following Example:

EXAMPLE

1. A pre-mix was prepared by blending together the following dry ingredients:

75 parts potato flour
   25 parts rice flour
   .05 parts amylase enzyme (Rhozyme [Trademark] a fungal diastase as sold by Rohn and Haas).

2. 150 parts by water were heated to 80° C.

3. The dry pre-mix from 1 was added to the hot water and because the pre-mix was at ambient temperature, the temperature of the mix dropped to the 60° range where the enzyme has good activity. The addition of the pre-mix was regulated so that the viscosity of the mixture remained low enough to allow proper agitation. In our experiments we found that the addition took three to four minutes.

4. After the addition of the pre-mix was completed the temperature of the mix was raised to about 80° C. and this temperature was maintained for ten minutes to completely deactivate the enzyme.

5. The next step in our preferred process was to aerate the material. The objective of this step is to create a number of very small air bubbles. The aeration is not essential and a chip with good eating qualities can be made without it but aeration improves drying rates and by means of aeration it is possible to control tenderness of the finished chip. Aeration alters the fragility of the product by creating thinner layers of solids in the product.

6. The resulting aerated, hot suspension of potato and rice flours from step 5 and was then cast into a sheet with a thickness of about 45 mils. The preferred method of casting and drying is to use a so-called Microflake dehydrator manufactured by the American Machine and Foundry Company.

Steps 5 and 6 of the process are described in more detail in our copending United States patent application Ser. No. 2,407 called "Textured Food Product" and filed on Jan. 12, 1970.

7. The resulting film was dried to a moisture content of about 30% and flash-fried in oil (or shortening) at about 375° F. for a perod of 10–15 seconds. Alternatively the film can be preserved by drying to lower moisture or by freezing and kept as a non-perishable semi-fabricated product. It should be understood that the example describes a procedure that was found to produce a good product. The invention is not limited by the procedure and conditions as described.

What we claim as our invention is:

1. In a method of preparing a crisp snack food from a fluid batter comprising potato solids and water in which the fluid batter is cast into a film of desired thickness and dried so that the dried product will produce a golden coloured crisp snack food when cooked; the improvement which comprises allowing an increase in the amount of solids content of said batter by reducing its viscosity to produce a batter of sufficient fluidity for casting said film by incorporating into said batter an enzyme consisting essentially of α-amylase, permitting the α-amylase to partially hydrolyze the starch molecules of the potato solids, and subsequently heating the batter to deactivate the α-amylase, and wherein the fluid batter is aerated before casting.

2. In a method of preparing a crisp snack food from a fluid batter comprising potato solids and water in which the fluid batter is cast into a film of desired thickness and dried such that the dried product will produce a golden coloured crisp snack food when cooked; the improvement which comprises allowing an increase in the amount of solids content of said batter by reducing its viscosity to produce a batter of sufficient fluidity for casting said film by incorporating into said batter an enzyme consisting essentially of α-amylase, permitting the α-amylase to partially hydrolyze the starch molecules of the potato solids, and subsequently heating the batter to deactivate the α-amylase, and wherein the α-amylase is dry blended with the potato solids and the dry mix is dispersed in water at a temperature at which the enzyme is active.

References Cited

UNITED STATES PATENTS

| | | | |
|---|---|---|---|
| 1,916,872 | 7/1933 | Wachman | 195—22 |
| 2,153,445 | 4/1939 | Willaman | 195—31 R |
| 2,175,486 | 10/1939 | Singer | 195—24 |
| 3,249,512 | 5/1966 | Bode | 195—31 |
| 3,282,197 | 11/1966 | Smith | 99—100 |
| 3,293,142 | 12/1966 | Yamada | 195—31 R |
| 3,297,450 | 1/1967 | Loska | 99—207 |
| 3,595,666 | 7/1971 | Dumming | 195—31 R |
| 3,371,018 | 2/1968 | Ewing | 195—31 R |
| 3,532,602 | 10/1970 | Seidman | 195—31 R |
| 2,598,838 | 6/1952 | Schermerhom | 99—100 |

OTHER REFERENCES

*Foods of the World*, Time Life Books, N.Y., 1971, p. 129.

WILBUR L. BASCOMB, JR., Primary Examiner

M. G. NULLY, Assistant Examiner

U.S. Cl. X.R.

426—52, 346, 347, 372

UNITED STATES PATENT OFFICE
CERTIFICATE OF CORRECTION

Patent No. 3,840,673          Dated October 8, 1974

Inventor(s) Cornelis Kortschot and Peter F. Adams

It is certified that error appears in the above-identified patent and that said Letters Patent are hereby corrected as shown below:

In the title, line 2, page 1, the word "Butter" should be changed to read --Batter--

Signed and sealed this 4th day of March 1975.

(SEAL)
Attest:

RUTH C. MASON
Attesting Officer

C. MARSHALL DANN
Commissioner of Patents
and Trademarks